United States Patent
Graybill et al.

[15] 3,679,341
[45] July 25, 1972

[54] APPARATUS FOR IMPACT INJECTION MOLDING OF PLASTIC ARTICLES

[72] Inventors: Harold W. Graybill, Lambertville, Mich.; James E. Heider; Harold P. Sponseller, both of Toledo, Ohio

[73] Assignee: Owens-Illinois, Inc.

[22] Filed: Sept. 25, 1970

[21] Appl. No.: 75,599

[52] U.S. Cl. ............................. 425/244, 425/159, 425/191
[51] Int. Cl. ........................................................ B29f 1/03
[58] Field of Search .......... 18/30 AA, 30 AH, 30 AC, 30 AP, 18/30 AR, 30 NR, 30 NS, 30 NW, 30 NY, 30 QM, 30 D, DIG. 14, 30 NM, 30 NB, 30 AM

[56] References Cited

UNITED STATES PATENTS

| | | | |
|---|---|---|---|
| 2,804,649 | 9/1957 | Hypfield | 18/30 NW |
| 2,602,189 | 7/1952 | Finelt | 18/30 AR |
| 3,095,609 | 7/1963 | Lievre | 18/30 NY |
| 3,590,439 | 7/1971 | Swanson | 18/30 AC |

FOREIGN PATENTS OR APPLICATIONS

| | | | |
|---|---|---|---|
| 569,155 | 1945 | Great Britain | 18/30 AH |
| 211,308 | 1966 | Sweden | 18/30 AC |
| 1,217,152 | 1959 | France | 18/30 NY |

*Primary Examiner*—J. Spencer Overholser
*Assistant Examiner*—David S. Safran
*Attorney*—Philip M. Rice and E. J. Holler

[57] ABSTRACT

An apparatus and method for injection molding or impact molding from a source of plasticized material at a pressure independent of the source pressure. The apparatus includes a piston freely floating in an accumulation chamber to which material is supplied at source pressure, as by an extruder, and a valving nozzle through which the piston expresses material at a different pressure. The actuating force is generated by relative source-mold closing movement and is transmitted by the mold-contacting nozzle to the piston to sequentially establish mold-accumulator chamber communication, isolate the accumulation chamber from the material source, and inject material from the accumulation chamber through the nozzle into the mold at the independent pressure. Upon relative source-mold opening movement, the mold-accumulator chamber communication is interrupted and the accumulation chamber is replenished with material from the source at the source pressure.

6 Claims, 2 Drawing Figures

PATENTED JUL 25 1972

3,679,341

INVENTOR.
HAROLD W. GRAYBILL
BY JAMES E. HEIDER
HAROLD P. SPONSELLER
Philip M. Rice
& E.J. Holler
ATTORNEYS

000
APPARATUS FOR IMPACT INJECTION MOLDING OF PLASTIC ARTICLES

BACKGROUND AND SUMMARY OF THE INVENTION

The present invention relates to a method and apparatus for making an article from plasticized material and, more in particular, to a method and apparatus for making a plastic article by an improved impact injection molding process.

In the manufacture of articles from plasticized material it has been proposed herebefore that articles having portions of critical dimensions be manufactured by a process involving the injection molding of the critical part.

It has also been proposed to use the kinetic energy of a displaceable mold to transfer a charge of plasticized material into a mold cavity. This process is known as impact displacement or impact injection molding. Since considerable energy is available in the moving mold mechanism when the mold is closing, this energy is transferred to the plastic body or charge accumulated in the extruder head, causing the charge of plasticized material to fill the empty mold cavity at high speed. The plasticized material acts as a shock absorber to smooth out cycle shocks as the injection takes place.

It has also been proposed herebefore to accumulate and confine a body or charge of plasticized material of a predetermined volume in a chamber which is in open communication with the injection mold and to utilize relative mold-chamber movement to reduce the volume of the chamber momentarily to thereby eject plastic material under pressure from the confined body of material into the mold. After the mold cavity is filled, the mold and chamber are moved relatively to each other to again enlarge the chamber volume with that portion of material in the mold being replaced in the chamber by additional plasticized material supplied by the extruder.

However, this known apparatus requires the provision of a separate power actuated cut-off valve between the chamber and the extruder for intermittent open and closed communication between the chamber and the extruder. This, necessarily, has to be done in a timed cycle and in response to the relative mold and chamber movement requiring separate valve actuating and control mechanism, thereby unnecessarily complicating the installation and operation of the apparatus and slow down the operating cycle since all such control mechanism have a certain time delay factor.

The present invention provides an improved simplified and relatively faster method of making articles from plasticized material by a combination impact and injection molding process. The present improved apparatus eliminates the necessity for a separate cut-off valve and its associated actuating control mechanism to thereby obtain a more continuous cycle and a more accurate control of the volume of plasticized material to be injected into the mold cavity at a higher speed.

The present invention is utilized in conjunction with any suitable source of plasticized plastic material such as a conventional extruder apparatus which may be of the piston or screw type normally disposed in a horizontal position. The extruder ordinarily has a longitudinal barrel which is aligned with the mold disposed in front of the barrel head and which is relatively displaceable towards and away from the barrel head. The extruder conveys plasticized material in pelletized or any other form into the barrel head from which the plasticized material is injected into the mold when the mold is brought into position against the barrel head.

The improved apparatus provides an improved barrel head construction for combined impact and injection molding which contains only two moving parts: a piston and a nozzle. The piston is contained in the chamber of the barrel head and has at one end a portion which acts as a valve to close communication between the chamber and the interior of the barrel in one position of the piston and to open communication between the chamber and the interior of the barrel in another position of the piston. The piston has internal passages to receive plastic material from the chamber and conveys the plastic material into the nozzle which is slidably disposed over a portion of the piston. The nozzle has an orifice from which the plastic material is injected into the mold as the mold is brought into position. The nozzle is displaceable relative to the piston to thereby intermittently open and close communication between the internal passages of the piston and the nozzle.

Initially, the piston is in a position establishing communication between the chamber and the interior of the barrel to admit plasticized material into the chamber and from the chamber into the internal passages of the piston. In that position, the nozzle is disposed relative to the piston so as to close communication between the internal passages of the piston and the nozzle orifice.

In the impact injecting position, the mold is moved against the nozzle to displace the nozzle relative to the piston to open communication between the interior passages of the piston and the nozzle orifice. Substantially simultaneously and by the same mold movement, the piston is displaced within the chamber to considerably reduce the volume of the chamber and simultaneously close the valve to interupt communication between the interior of the barrel and the chamber. The substantial reduction in volume of the chamber by the movement of the piston causes the plasticized material accumulated in the chamber to be injected through the internal passages of the piston into the nozzle and through the nozzle orifice into the mold at relatively high speed and pressure.

After the injection operation the mold moves away from the nozzle which follows the mold movement to again close the internal passages of the piston. The removal of mold pressure against the nozzle and the piston causes the piston to move back again into its initial position by internal pressure of the plasticized material in the barrel to again fill the chamber with plasticized material.

The plasticized material in the barrel and barrel head is heated to maintain its fluid condition while the mold is maintained at a substantially colder temperature and may even be chilled to below zero. An important feature of the present invention is that the improved construction of the barrel head assures that the remnants of plasticized material retained in the improved barrel head after injection will be maintained at the same temperature as the plasticized material in the barrel to effectively prevent solidification of portions of the plasticized material in the barrel head and nozzle after the injection cycle.

The present improved apparatus causes very fast mold injection, leading to a considerable improvement in total cycle time. These improvements are three-fold in that first, the fast fill permits much lower mold temperatures than hitherto possible, second, lower mold temperatures permit a much shorter cooling time; and third the time lost in normal injection molding, i.e., time to make certain switches, control time, hydraulic valve shifting time, etc., all are eliminated. These three advantages add up to a substantial improvement in production rates.

The present improved barrel head construction is of mechanical simplicity and adapts itself easily to existing injection molding practices. Specific hydraulic valves, cylinders, limit switches, timer and so on, now necessary in present injection machines, are eliminated, thus simplifying the equipment rather than making it more complicated.

The present improved device permits the use of multiple mold cavities at lower total mold cost, since the molds can be run at higher speeds, which is particularly significant for small volume parts.

The present invention will be best understood by reference to the following detailed description in conjunction with the appended drawings illustrating a preferred embodiment thereof.

DESCRIPTION OF THE PREFERRED EMBODIMENT

Figure 1:
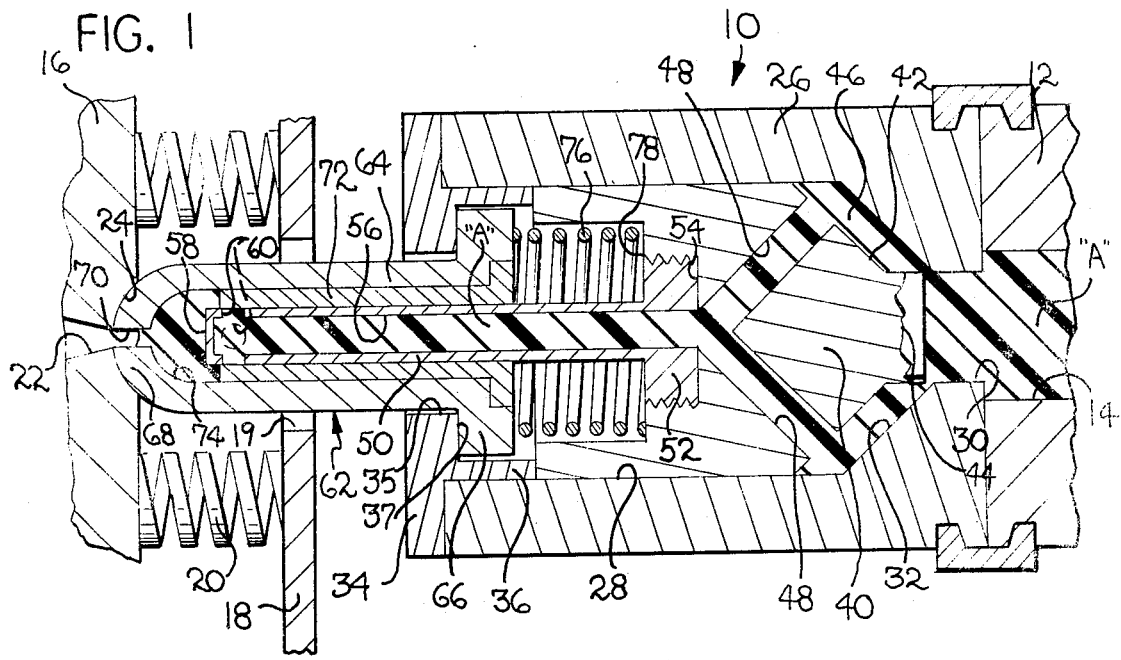
FIG. 1 is a longitudinal cross-section through the present improved apparatus shown in the fill position.

With continuous reference to the drawings, the present improved device is associated with a barrel head 10 attached to the end of a barrel 12 of an extrustion molding machine (not shown) which may be of conventional, well known design. The barrel 12 has an internal bore or conduit 14 through which plasticized material "A" flows under pressure provided by the extruder, or other suitable plasticizing means.

A displacable mold, indicated at 16, is positioned in front of the barrel head 10 which is supported against a wall 18, between the barrel head 10 and the mold 16, by means of springs 20 or other known energy storing return devices. The mold 16 can be of any particular construction designed to produce specific articles from a plasticized material "A" and the mold per se forms no part of the present invention other than in combination therewith. For the purpose of description of the operation of the present improved device, the mold is conventionally provided with a material inlet or throat channel 22 and a gate or nozzle seat 24.

The present improved barrel head 10 comprises a cylindrical housing 26 which is attached to the barrel 12 in axially aligned position. The housing 26 contains a cylindrical chamber 28 which terminates at the inner end, that is towards the barrel 12, into a considerably smaller diameter section 30, which is in communication with the conduit 14 of the barrel 12. The section of the chamber 28 between the main portion of the chamber and the reduced diameter section or passage 30, has a conical surface 32 for a purpose to appear.

The open front end of the chamber 28 is closed by a cap 34 which is suitably fastened to the housing 26 by any known means (not shown). The front end cap 34 has an inwardly extending radial flange portion 36 adapted to be in sealing contact with the internal surface of the chamber 28 into which the flange portion 36 extends.

The chamber 28 contains a free floating piston 38 disposed therein for limited reciprocating movement between the inner end of the radial flange 36 of the front end cap member 34 and the conical surface 32 at the rear of the chamber 28. The piston 38 comprises a cylindrical body in sliding sealing contact with the radial inner surface of the chamber 28 and terminates rearwardly into the conical end portion 40 having a conical surface 42 matching the internal conical surface 32 of the chamber 28. The conical rear end portion 40 of the piston 38 terminates into a cylindrical portion 44 of greatly reduced diameter, which corresponds to the internal diameter of the passage 30 for sliding sealing engagement therein in the retracted position of the piston 38. Thus, the cylindrical rear end portion 44 of the piston 38 cooperates with the reduced diameter section 30 to provide an integral valve means adapted to intermittently open or close the passage 30 to the chamber 28 in correspondence to the relative position of the piston 38 within the chamber 28, as will be more fully explained hereafter.

The chamber space provided between the conical surface 42 of the piston 38 and internal conical surface 32 of the chamber 28 provides a displacement cavity or accumulator chamber 46 adapted to be filled with plasticized material "A" from the barrel conduit 14 through the chamber passage 30 when the piston 38 is in the forward position as shown in FIG. 1.

The piston 38 is provided with a plurality of internal passages 48, which are open to the accumulator chamber 46 and extend from the conical surface 42 inwardly towards the axial center of the piston 38.

An injector tube 50 is attached to the front end of the piston 38 by means of a threaded head portion 52 which threads into a complementary threaded recess 54 in the piston 38.

The injector tube 50 has a longitudinal axial bore 56 which extends through the threaded head portion 52 and the piston passages 48 are disposed such as to empty into the injector tube conduit 56 at the axial center of the piston 38.

The injector tube 50 extends forwardly in axial direction beyond the piston and out of the housing 26. The outer end of the tube is closed as at 58 and a plurality of apertures 60 are provided in the wall of the tube adjacent the front closure 58 for a purpose to appear.

Figure 2:
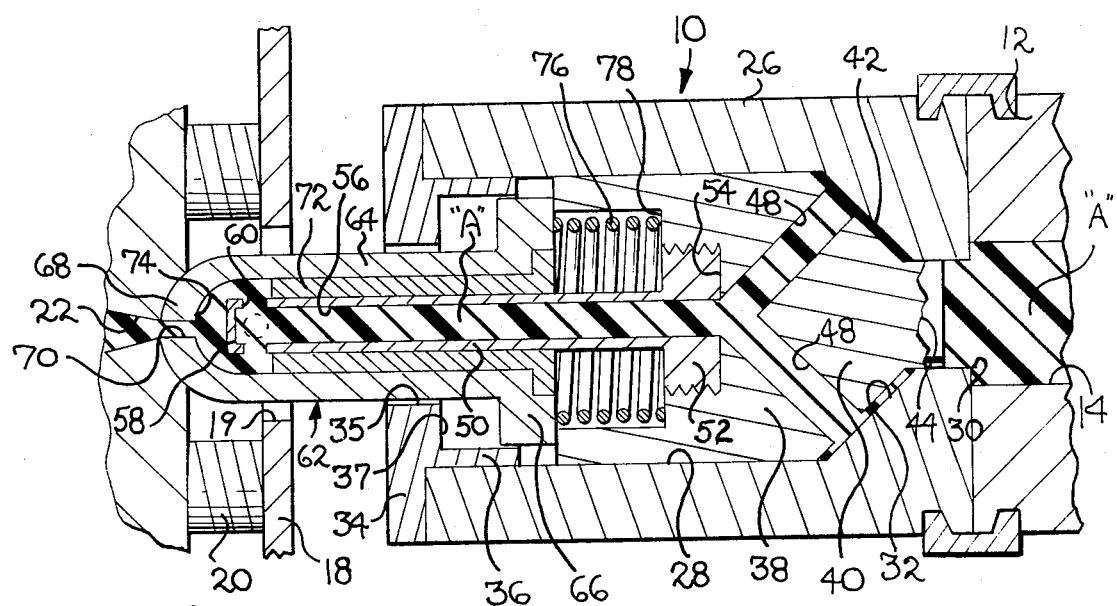
FIG. 2 is a cross-section similar to FIG. 1 showing the improved apparatus in the injecting position.

The injector tube 50 slidingly supports a nozzle assembly 62 which substantially comprises an elongated cylindrical body 64 which extends into the housing 26 through an appropiate aperture 35 provided in the front end cap 34. The inner end of the nozzle assembly 62, which extends into the housing 26, is provided with a radial flange or head portion 66 which is adapted to abut in one position of the nozzle assembly against the inner surface 37 of the front end cap 34 within the axial flange 36, as shown in FIG. 1, and in another position of the nozzle assembly against the front end of the piston 38, as shown in FIG. 2.

The nozzle assembly 64 has a closed semi-spherical outer end 68 which is a continuation of the elongated cylindrical body portion 64. The semi-spherical tip portion 68 of the nozzle assembly 62 is adapted for sealing engagement against the concave nozzle seat 24 of the mold 16 and is provided with a central orifice 70 adapted for communication with the throat channel 22 of the mold 16.

The nozzle assembly 62 is provided with an internal cylindrical sleeve 72 disposed within the cylindrical body portion 64 of the nozzle assembly and which is suitably secured thereto. The sleeve 72 of the nozzle assembly is in sliding engagement with the outer surface of the injector tube 50 and is of an axial length so as to terminate adjacent the semi-shperical tip portion 68 of the nozzle assembly and immediately adjacent the upper end of the injector tube 50. It will be noted that a chamber or cavity 74 is provided within the semi-spherical tip portion 68 of the nozzle assembly defined by the inner end surface of the nozzle sleeve 72 and the closed end 58 of the injector tube 50.

The nozzle assembly 62 and the piston 38 are biased in opposite direction by means of a spring 76 which is disposed around the lower or inner end of the injector tube 50 within a recess 78 in the front end of the piston 38. The spring 76 acts at one end against the surface of the head portion 66 of the nozzle assembly and at the other end against the bottom surface of the recess 78 of the piston 38 to thereby urge both members in opposite direction.

In installation, the nozzle assembly 62 extends through an aperture 19 provided in the wall 18 for engagement with the mold 16.

In operation of the device: in the initial or fill position of the improved barrel head assembly 10 the co-acting members of the device are in a position as shown in FIG. 1. In this position, the mold 16 is in the retracted position. The mold 16, as is common practice, is power actuated for advance and retraction towards and away from the barrel head assembly 10. The nozzle assembly 62 is disposed in forwardly extended position and biased by the spring 76 against the inner surface 37 of the front end cap 34 which limits further outward movement of the nozzle and retains the nozzle assembly in the housing 26. Since, in this position, no forces are directed against the nozzle assembly 62 inwardly of the barrel head, the pressure of the plasticized material "A" from the barrel 12 of the extruder overcomes the force of the spring 76 to move the piston towards the left, in the drawing, and into abutment against the inner end of the axially inwardly extending flange 36 of the end cap 34. This causes the cylindrical end portion 44 of the piston to move out of the passage 30 to open communication between the bore 14 of the barrel 12 and the accumulator chamber 46 in the rear of the piston. By means of forced pressure from the extruder, the plasticized material "A," which is preferably heated to a temperature to maintain the material in fluidic condition, flows into the accumulator chamber 46 and into the internal piston passages 48 and the axial conduit 56 of the injector tube 50 until these cavities are all completely filled with plasticized material. It will be noted, that in the fill position, the upper end of the internal sleeve 72 of the nozzle assembly 62 covers the apertures 60 at the upper end of the injector tube 50 to prevent communication of the injector tube with the cavity 74 in the semi-spherical tip portion of the nozzle assembly.

After the injector tube 50, internal piston passages 48 and the accumulator chamber 46 have been completely filled with pressurized plasticized material "A," the mold 16, which is preferably chilled to a substantially lower temperature than the material "A," is cycled for movement towards the right, in the drawings, against the force of the return springs 20, thereby pushing the nozzle assembly 62 axially inwardly of the housing in telescopic fashion by being slidably positioned around the injector tube 50. The apparatus now moves to the impact injecting position of the device as shown in FIG. 2.

The very heavy, quick pressure force by the moving die exerted against the nozzle assembly 62, causes the nozzle assembly to move inwardly against the force of the spring 76 thereby eventually opening the apertures 60 at the top end of the injector tube 50 by axial displacement of the interior sleeve 72 along the injector tube. The plasticized material "A," contained in the injector tube 50, now flows through the apertures 60 into the chamber or cavity 74 in the semispherical tip portion 68 of the nozzle assembly 62 and through the nozzle orifice 70 into the throat channel 22 of the mold 16.

Continuing pressure force by the mold 16 towards the wall 18 causes abutment of the head portion 66 of the nozzle assembly against the front end of the piston 38 and movement of the piston 38 by the nozzle 62 rearwardly. This movement of the piston rearwardly causes a reduction in volume of the accumulator chamber 46, forcing plasticized material from the accumulator chamber into the injector tube 50. It shall be noted, however, that during initial rearward movement of the piston 38 plasticized material will not only flow into the piston through the passages 48 but there will also be a slight backflow of the material through the connecting channel 30 into the barrel 12 since the pressure force of the moving mold is substantially larger than the pressure of the plasticized material "A." Movement of the piston 38, however, is very quick to rapidly close the connecting channel 30 by movement of the cylindrical rear end portion 44 into the connecting channel, which seals the barrel head off against the barrel 12.

During final movement of the mold 16 the piston 38 moves more rapidly towards the rear thereby rapidly decreasing the volume of the accumulator chamber 46, forcing the plasticized material "A" through the piston passages 48 and injector tube 50 into the end tip of the nozzle for injection into the mold 16 through the nozzle orifice 70 at a relatively high speed and pressure.

At the finish of the pressure stroke by the mold 16, the apparatus has assumed the position shown in FIG. 2. A predetermined amount of plasticized material, trapped in the accumulator chamber 46, has been rapidly injected into the mold 16 in correspondence with the capacity of the mold cavity (not shown). Hereafter, forced pressure on the mold 16 is released and the return springs 20 push the mold back to the left, in the drawing, towards its original position as that shown in FIG. 1. Release of pressure on the nozzle assembly 62 causes the nozzle assembly 62 to follow the mold movement 16 by means of the expansion force of the spring 76 to thereby again rapidly close the apertures 60 at the upper end of the injector tube 50 to interupt communication between the injector tube and the cavity 74 in the semi-spherical tip portion of the nozzle assembly. As the mold recedes from the nozzle end, the nozzle orifice 70 is designed such as to pull the remnants of plasticized material from the throat channel 22 of the mold into the semi-spherical cavity 74 at the nozzle tip, which will be trapped therein since the apertures 60 leading into the injection tube are closed off by the sleeve 72. By this arrangement remnants of plasticized material pulled from the mold 16 into the nozzle tip cavity 74, will be maintained hot and in fluidic condition in contrast to the chilled mold temperature in which the remnants of the plasticized material if left in the throat channel would quickly solidified and form undesirable cold slugs. Remnants of the plasticized material are also contained with the injector tube 50 and in the piston passages 48 immediately after injection and after the apertures 60 have been closed. However, this is not an adverse condition, since the barrel head assembly is heated and thus maintains the remnants of plasticized material in a fluidic state.

Since mold pressure is removed from the nozzle assembly 62, the pressure of the plasticized material conveyed by the extruder, is greater than the expansion force of the spring 76 to thereby force the piston 38 again towards the left, in the drawing, causing the cylindrical rear end portion 44 to recede from the connecting channel 30 to again open communication between the accumulator chamber 46 and the bore 14 of the barrel 12 to cause a renewed flow of plasticized material; into the accumulator chamber behind the piston, forcing the piston further to the left until the piston abuts against the inner end of the flange 36.

Thus, the improved barrel head assembly 10 is again in the position as shown in FIG. 1, the apertures 60 of the injector tube 50 being closed by the forwardly extended sleeve insert 72 of the nozzle assembly 62. It will be noted that operation of the nozzle assembly 62 to inject plasticized material into the mold cavity of the mold 16, is completely dependent on mold movement and thus assuring positive and fast injection of the plasticized material and a clean breakaway after injection in which the nozzle tip 68 draws the remnants of plasticized material from the mold throat channel 22 into the semi-spherical cavity 74 at the tip of the nozzle to eliminate the formation of cold slugs and to keep the remnant plasticized material hot and in fluidic state for the next injection cycle.

The displacement volume of the accumulator chamber 46 can, of course, be varied to suit any particular requirements of any particular amount of charge of plasticized material to be injected into the mold 60. This can be done in various ways, as for instance, by insertion of spaces between the axial flange 36 of the front end cap and the front end of the piston or, more preferably, by regulating the extent of mold movement towards the barrel head.

It will be obvious from the description that all actions are purely mechanical, needing no hydraulic or electric control for controlling the amount of plasticized material to be injected or for power actuated movement of the nozzle or piston, respectively. After the cylindrical rear end portion 44 of the piston 38 has closed the connecting channel 30, displacement of the plasticized material from the accumulator chamber 36 is positive by action of the mold movement which causes respective relative displacement of the nozzle assembly 62 and the piston 28 in succession.

Thus, it will be appreciated that the present invention provides an improved, simplified and purely mechanically actuated injection device providing very fast and accurate operating cycles for refill and injection and positive impact displacement of the plasticized material trapped in the barrel head by quick advance of the mold at a relatively high pressure.

The evident advantages of the present improved barrel head assembly are multi-fold and some of which are that the present improved construction permits much colder mold temperatures and has considerably lower heat transfer; it prevents premature mold fill or flash by purely mechanical process and allows much faster mold operation. The present improved construction premeasures the charge of plasticized material by volume and provides positive charge displacement. The amount of charge of plasticized material is controllable and can be varied to suit particular requirements and no electrical or hydraulic controls are needed for actuation of the barrel head assembly.

Although the present invention has been described by means of a preferred embodiment, it will be obvious that various changes in construction and detail may be made by a person skilled in the art to which the invention pertains without departing from the spirit and essential characteristic of the invention as indicated by the scope of the appended claims.

What is claimed is:

1. In a molding apparatus for injecting plasticized material from a source of such material into the cavity of an injection mold in response to relative mold-source movement, the improvement comprising: a barrel head on the source, a nozzle in said barrel head having an interior passage, a free floating piston in said barrel head adjacent said nozzle, means enclosing said piston and defining therewith an accumulator space normally in communication with the source, passage means traversing said piston for the flow of material from said space through said nozzle to said mold; actuatable valve means interposed between the nozzle and the piston and being movable between open and closed positions, means responsive to impacting of said nozzle by said mold for positioning said valve means in its open position, and means carried by said piston for preventing communication between said accumulator and said source when said valve means is in its open position.

2. In the apparatus as defined in claim 1, the further improvement wherein said actuatable valve means comprises telescoping interfitting tubular members on said piston and said nozzle, one of said tubular members having radial ports selectively exposed by relative movement of said tubular members, and a spring normally biasing said members into overlapping, closed relation to close said ports.

3. In a molding apparatus for injecting plasticized material supplied from a source having a barrel head into the cavity of an injection mold in response to relative mold-barrel head movement, the improvement comprising: a nozzle carried by said barrel head for relative movement and having an interior passage communicating with the mold cavity; a free floating piston adjacent said nozzle and movable relative thereto; means enclosing said piston and defining therewith an accumulator space for receiving plasticized material from source; said piston being interposed between said nozzle and said space, said nozzle and said piston being jointly movable in a first direction upon impact of the mold against said nozzle to reduce the size of said accumulator space, passage means traversing said piston and through which material flows from said space to said nozzle passage upon joint nozzle-piston movement in said first direction, and valve means isolating the accumulator space from the source as a consequence of such joint nozzle-piston movement, so that relative mold-barrel head movement in said first direction injects material from said accumulator space into said mold cavity under pressure independently of the pressure of the source.

4. In a molding apparatus for injecting plasticized material supplied from a source of such material to an orifice into the cavity of an injection mold in response to relative mold-orifice movement, the improvement comprising: a housing disposed between said mold and said orifice, a piston enclosed within said housing and movable therein, one face of said piston cooperating with the housing to define a variable volume accumulator space for receiving plasticized material from said orifice; said one piston face having a first extension insertable into said orifice to isolate said space from said orifice upon piston movement in a first direction within said housing; a second piston extension projecting in the opposite axial direction from said space and having a dispensing bore communicating with said space; a nozzle slidable upon said second piston extension and having an interior passage (1) communicating with said bore at one adjusted position of said nozzle and (2) isolated from said bore at a second adjusted position of said nozzle, a spring interposed between said piston and said nozzle normally biasing said nozzle to said second position, and the nozzle, when in its first adjusted position, abutting said piston and the nozzle passage communicating with the cavity of said mold, relative mold-barrel head movement in said first direction displacing said nozzle and said piston (a) to isolate said passage from said space and (b) to inject material from said space through said second piston extension bore and the nozzle passage into the mold cavity.

5. In an injection molding apparatus including relatively movable mold means and plasticized material supply means, the improvement comprising: a nozzle assembly interposed therebetween and including telescopically movable piston and nozzle elements each having flow passages therethrough; means including said piston element defining a displacement cavity normally containing plasticized material at source pressure; spring means normally biasing said piston and nozzle elements to a position at which said flow passages do not communicate with each other and said mold means is isolated from said displacement cavity, and means responsive to relative mold means-source means movement in a first direction for initially telescopically moving said piston and nozzle elements to establish communication between said passages and then jointly moving said piston and nozzle elements to displace plasticized material from said cavity into said mold means via said passages.

6. In an injection molding apparatus including a mold spaced from a source of plasticized material having a dispensing head, the improvement wherein: said mold and head being relatively movable toward and away from one another; a nozzle structure disposed in said head between said mold and said source, said head comprising housing means fixed to the source and defining an interior cavity for receiving plasticized material from said source; a piston axially slidable in said cavity; said piston and an adjacent wall of said cavity defining an accumulator space communicating with the source through an opening in the housing wall; a nozzle spindle carried by said piston for movement therewith; a tubular nozzle element slidable on said spindle and projecting beyond said housing; a dispensing opening on said nozzle element; a flow passage in said spindle communicating with said accumulator space; and cooperating surfaces on said spindle and said nozzle element selectively opening and closing said flow passage to permit or prevent the flow of plasticized material through the nozzle dispensing opening; cooperable abutment means on said nozzle element and said piston; and spring means normally biasing said nozzle element and said piston from abutment and positioning the nozzle element to isolate said mold from said cavity.

* * * * *